United States Patent Office 3,014,035
Patented Dec. 19, 1961

3,014,035
MERCAPTO DERIVATIVES OF PYRAZOLO
[3,4-d]PYRIMIDINES
Paul Schmidt, Therwil, and Max Wilhelm, Basel, Switzerland, assignors to Ciba Pharmaceutical Products Inc., Summit, N.J.
No Drawing. Filed Mar. 30, 1960, Ser. No. 18,480
Claims priority, application Switzerland Apr. 17, 1959
6 Claims. (Cl. 260—256.5)

The present invention relates to the manufacture of pyrazolo[3:4-d]pyrimidines having the structure of the formula

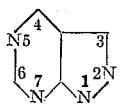

and containing in the 3-position a free hydroxyl or amino group, or a free or substituted mercapto group and in the 6-position a free or substituted mercapto group, and, if desired, of their salts.

The new compounds are unsubstituted at the nitrogen atoms of the pyrazole ring or have at one of these nitrogen atoms a lower substituted or unsubstituted hydrocarbon radical which preferably belongs to the aliphatic or cycloaliphatic series. Substituents particularly suitable in this connection are free or substituted hydroxyl or amino groups, for example lower alkyl, oxyalkyl, aminoalkyl, aza, oxaalkyl or cycloalkyl radicals, such as methyl, ethyl, propyl, isopropyl, butyl, isobutyl, secondary butyl, pentyl, isopentyl, secondary pentyl, tertiary pentyl, hexyl, heptyl, cyclopentyl, cyclohexyl, β-hydroxyethyl, 3-oxa-heptyl-(6), 3-oxa-pentyl groups, and the like.

The new compounds may also be substituted in the 4-position, for example by hydrocarbon radicals, such as an alkyl or aryl radical.

A suitable substituted mercapto group in the 6-position and, if desired, in the 3-position is, for example, a mercapto group substituted by an unsubstituted or substituted hydrocarbon radical especially one of aliphatic character, above all a lower-alkyl-mercapto group such as a methyl-mercapto or ethyl-mercapto group.

The new compounds possess valuable properties. They dilate the coronary arteries, affect the central nervous system and have an antirheumatic and diuretic action. They are also active against virus infections and are anti-schistosomatic. They are intended to be used as medicaments or as intermediates for the manufacture of medicaments; they can be converted by reaction with an amine under severe conditions into 6-amino-compounds, such compounds are described in U.S. patent applications Ser. No. 777,846 and Ser. No. 777,859, filed December 10, 1958, by Jean Druey et al.

Of special value are the compounds of the formula

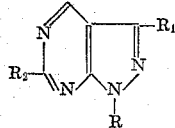

in which R represents an alkyl or alkoxyalkyl radical; $R_1$ a hydroxyl or amino group; and $R_2$ a lower alkyl-mercapto group.

The new compounds are surprisingly obtained when a pyrimidine containing in the 2-position a free or substituted mercapto group, in the 4-position an exchangeable residue and in the 5-position a free, esterified, halogenated or amidated carboxyl group or a nitrile group, is reacted with hydrazine, or with a hydrazine which is monosubstituted by a substituted or unsubstituted hydrocarbon radical and which may further contain a residue that can be eliminated hydrolytically, and simultaneously, or if desired after the hydrolysis, the pyrazole ring is closed. The ring closure generally occurs in the reaction with the hydrazine when an unsubstituted or mono-substituted hydrazine has been used as reactant.

The exchangeable group in the 4-position is preferably a free or etherified mercapto group, for example an alkyl-mercapto group, such as the methylmercapto group or the benzyl-mercapto group, or a free or substituted amino group, for example the methylamino group or more especially a halogen atom, such as chlorine or bromine.

Stepwise the present process can be carried out, for example by using a hydrazine which is substituted by a radical capable of elimination by hydrolysis, such as an acyl radical, for example an acetyl radical, or a methylidene radical, and which may also contain a lower substituted or unsubstituted hydrocarbon radical, hydrolyzing the resulting straight-chain hydrazino compound and closing the ring simultaneously or subsequently, advantageously at an elevated temperature.

The afore-mentioned reactions can be carried out in the presence or absence of a diluent and/or condensing agent, at the ordinary or preferably an elevated temperature, under atmospheric or superatmospheric pressure.

In the resulting compounds a free mercapto group can be substituted in any desired manner, for example by treatment with reactive esters of alcohols, for example lower alkanols, tertiary aminoalkanols or alkoxyalkanols, advantageously in the presence of a basic condensing agent, such as an agent capable of forming metal salts, or with the use of a metal salt of the mercapto compound itself. Reactive esters, suitable for this purpose, are more especially esters of strong inorganic acids, such as hydrohalic or sulfuric acid, or of strong organic acids, for example organic sulfonic acids, such as toluenesulfonic acid.

The present invention further relates to any form of the present process in which an intermediate obtained at any stage of the process is used as starting material and the remaining step or steps are carried out, or the process is discontinued at any stage thereof, or the starting materials are formed in the course of the process.

Preferred starting materials and reactants are those which are covered by the above definitions of the final products.

The starting materials are known or can be made by methods as such known.

The pyrimidines used as starting material can be prepared, for example, by condensing a suitably substituted amidine with a malonic acid containing a carbonyl group, if desired in the form of the functional acid and/or carbonyl derivatives of such acid, and if desired by suitable conversion of substituents in the resulting pyrimidine. Thus, for example, an S-alkyl-isothiourea can be reacted with α-ethoxymethylene-α-cyanacetic acid ethyl ester to yield 2-alkylmercapto-4-hydroxy-5-cyano-pyrimidine in which the substituents can be converted in the usual, suitable manner.

Salts can be prepared depending on the substituents contained in the products of the present process: when the latter contain free hydroxyl or mercapto groups, their metal salts can be made, for example by dissolution in alkali metal hydroxide solutions. Compounds of basic reaction form salts with inorganic and organic acids. Examples of suitable salt-forming acids are: hydrohalic acids, sulfuric acids, phosphoric acids, nitric acid, perchloric acid; aliphatic, alicyclic, aromatic or heterocyclic carboxylic or sulfonic acids, such as formic acid, acetic acid, propionic acid, oxalic acid, succinic acid, glycolic acid, lactic acid, malic acid, tartaric acid, citric acid, ascorbic acid, hydroxymaleic acid, dihydroxymaleic acid or pyruvic acid; phenylacetic acid, benzoic acid, para-aminobenzoic acid, anthranilic acid, para-hydroxybenzoic acid, salicylic acid, or para-aminosalicylic acid; methanesulfonic acid, ethanesulfonic acid, hydroxyethanesulfonic acid, ethylenesulfonic acid; toluenesulfonic acid, naphthalene-sulfonic acids or sulfanilic acid; methionine, tryptophane, lysine or arginine.

The above-mentioned pyrazolo-pyrimidines, their salts or suitable mixtures can be used, for example, in the form of pharmaceutical preparations which contain the specified compounds in admixture with a pharmaceutical organic or inorganic excipient suitable for enteral, parenteral or local administration. Suitable excipients are substances that do not react with the specified compounds, such as water, gelatine, lactose, starches, magnesium stearate, talc, vegetable oils, benzyl alcohols, gums, polyalkylene glycols, chloesterol or other known pharmaceutical excipients. The pharmaceutical preparations may be, for example, tablets, dragees or, in liquid form, solutions, suspensions or emulsions. They may be sterilized and/or contain assistants such as preserving, stabilizing, wetting or emulsifying agents. They may further contain other therapeutically valuable substances. The preparations are formulated by the conventional methods.

The following examples illustrate the invention.

*Example 1*

4 grams of 2-methylmercapto-4-chloro-5-cyanopyrimidine are mixed with 10 grams of isopropyl-hydrazine and 75 cc. of ethanol and refluxed for 6 hours. The ethanol is then expelled in vacuo and the residue is treated with 50 cc. of water and 25 cc. of 2 N-sodium hydroxide solution. A solid precipitate is formed which is recrystallized from ethanol to yield 1-isopropyl-3-amino-6-methylmercapto-pyrazolo[3:4-d]pyramidine of the formula

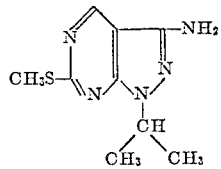

in yellow crystals melting at 192–194° C.

The 3-methylmercapto-4-chloro- -5 - cyanopyrimidine used as starting material is prepared in the following manner:

12 grams of 2-methylmercapto-4-hydroxy-5-cyano-pyrimidine are mixed with 200 cc. of phosphorus oxychloride and heated at the boil for 2 hours. The surplus phosphorus oxychloride is then removed in vacuo, and the residue is dissolved in chloroform. The chloroformic solution is extracted with saturated sodium bicarbonate solution and water and then evaporated to yield an oil which crystallises after having been kept for some time. It is purified by recrystallization from benzene+petroleum ether. 2-methylmercapto-4-chloro-5-cyanopyrimidine of the formula

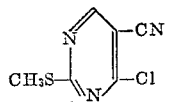

is obtained in white crystals melting at 67–68° C.

*Example 2*

A solution of 4 grams of 2-methylmercapto-4-chloro-5-cyanopyrimidine and 10 grams of N-[1-ethoxy-butyl-(3)]-hydrazine in 75 cc. of ethanol is refluxed for 6 hours. The ethanol is evaporated and 50 cc. of 2 N-sodium hydroxide solution are added, and the mixture is repeatedly extracted with chloroform. Drying and evaporation of the organic extract yields a solid residue which is recrystallized from ethanol to yield 1-[1'-ethoxy-butyl-(3')]-amino-6 - methylmercapto - pyrazolo[3:4-d]pyrimidine of the formula

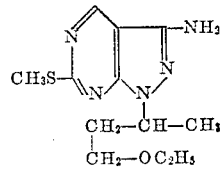

in pale yellow crystals melting at 134–136° C.

*Example 3*

A solution of 10 grams of 2-methylmercapto-4-chloro-5-carbethoxy-primidine and 4 grams of methylhydrazine in 100 cc. of ethanol is heated for 7 hours at 50° C. The solution is then evaporated to a volume of 25 cc., neutralized with 2 N-hydrochloric acid, and the precipitate formed is filtered off, dissolved in dimethyl formamide and precipitated with methylene chloride. The resulting product is the 1-methyl-3-hydroxy-6-methylmercapto-pyrazol[3:4-d]pyrimidine of the formula

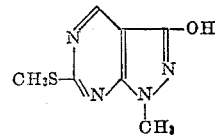

in crystals melting at 282–285° C.

What is claimed is:

1. A compound of the formula

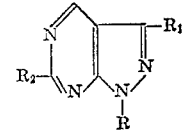

in which R stands for a member selected from the group consisting of hydrogen, lower alkyl, hydroxy-lower alkyl, amino-lower alkyl, lower alkylamino-lower alkyl, lower alkoxy-lower alkyl cyclopentyl and cyclohexyl, $R_1$ for a member selected from the group consisting of —OH and —$NH_2$, $R_2$ for a member selected from the group consisting of —SH and lower alkyl-mercapto.

2. Acid addition salts of compounds claimed in claim 1.
3. Alkali metal salts of compounds claimed in claim 1.
4. 1-isopropyl-3-amino - 6 - methyl-mercapto-pyrazolo[3,4-d]pyrimidine.
5. 1-[1'ethoxy-butyl-(3')]-3-amino-6-methyl-mercapto-pyrazolo[3,4-d]pyrimidine.
6. 1-methyl-3-hydroxy-6-methylmercapto-pyrazolo[3,4-d]pyrimidine.

References Cited in the file of this patent

Falco et al.: Jour. Am. Chem. Soc., vol. 78, pp. 3143–3145 (1956).

Cheng et al.: Jour. Org. Chem., vol. 23, pp. 852–861 (1958).

UNITED STATES PATENT OFFICE
CERTIFICATE OF CORRECTION

Patent No. 3,014,035                 December 19, 1961

Paul Schmidt et al.

It is hereby certified that error appears in the above numbered patent requiring correction and that the said Letters Patent should read as corrected below.

Column 3, line 48, for "-chloro--5-" read -- -chloro-5- --; column 4, line 10, for "3')]-amino-" read -- (3')]-3-amino- --; line 31, for "razol[3:4-d]" read -- razolo[3:4-d] --; line 50, after "alkyl" insert a comma; same column 4, line 58, for "1-[1'ethoxy-" read -- 1-[1-methoxy- --.

Signed and sealed this 21st day of August 1962.

(SEAL)
Attest:

ESTON G. JOHNSON                          DAVID L. LADD

Attesting Officer                            Commissioner of Patents